United States Patent
Burkhart et al.

(10) Patent No.: US 6,828,391 B2
(45) Date of Patent: Dec. 7, 2004

(54) PLASTIFIED NOVOLAKS AS ADDITIVE TO RUBBER MIXTURES

(75) Inventors: Thomas Burkhart, Montabaur (DE); Siegfried Wallenwein, Buettelborn (DE)

(73) Assignee: Solutia Germany GmbH & Co. KG (DE)

( * ) Notice: Subject to any disclaimer, the term of this patent is extended or adjusted under 35 U.S.C. 154(b) by 22 days.

(21) Appl. No.: 10/317,683

(22) Filed: Dec. 12, 2002

(65) Prior Publication Data

US 2003/0134953 A1 Jul. 17, 2003

(30) Foreign Application Priority Data

Dec. 20, 2001 (DE) .......................................... 101 62 771

(51) Int. Cl.[7] .............................................. C08G 8/34
(52) U.S. Cl. ....................... 525/502; 525/504; 525/508; 525/480; 525/539; 524/270; 524/271; 524/272
(58) Field of Search .................................. 524/270, 271

(56) References Cited

U.S. PATENT DOCUMENTS

| | | | | |
|---|---|---|---|---|
| 3,965,061 A | * | 6/1976 | Bash et al. .................. | 524/271 |
| 4,197,378 A | * | 4/1980 | Rudolphy et al. .......... | 525/134 |
| 4,294,732 A | * | 10/1981 | Ohyachi et al. ............ | 524/271 |
| 4,383,005 A | * | 5/1983 | Weil et al. .................. | 428/625 |
| 4,506,059 A | * | 3/1985 | Hultzsch et al. ............ | 525/134 |
| 4,542,186 A | * | 9/1985 | Giller et al. ................ | 525/138 |
| 4,602,063 A | * | 7/1986 | Yamamoto et al. ......... | 525/127 |
| 4,744,925 A | * | 5/1988 | Lampo et al. .............. | 530/213 |
| 5,089,589 A | * | 2/1992 | Hesse et al. ................ | 528/129 |
| 5,096,996 A | * | 3/1992 | Hesse et al. ................ | 528/129 |
| 5,098,941 A | * | 3/1992 | Tsuriya ....................... | 524/270 |
| 5,100,929 A | * | 3/1992 | Uhrig et al. ................ | 527/602 |
| 5,427,612 A | * | 6/1995 | Bender ....................... | 524/270 |
| 5,597,884 A | * | 1/1997 | Bender ....................... | 528/34 |
| 5,667,858 A | * | 9/1997 | Pokorny ..................... | 428/41.8 |
| 6,399,702 B1 | * | 6/2002 | Kucera et al. .............. | 524/834 |
| 6,662,840 B2 | * | 12/2003 | Thielen et al. .............. | 152/547 |
| 2003/0134953 A1 | * | 7/2003 | Burkhart et al. ............ | 524/322 |

FOREIGN PATENT DOCUMENTS

| | | | | |
|---|---|---|---|---|
| EP | 0 362 727 B1 | 4/1990 | ............ | C08G/8/30 |
| GB | 2 254 379 C | 5/1974 | ............ | C07C/39/10 |
| GB | 1448374 | 9/1976 | ............ | C07C/39/10 |
| JP | 58-209497 A | * 12/1983 | ............ | B23K/35/00 |
| WO | WO 88/08860 A1 | 11/1988 | ............ | C08J/9/00 |

OTHER PUBLICATIONS

RU 2016008 C1 (Dolzhenkov et al.) Jul. 15, 1994 (Abstract only).*

Short Polyester Fiber Reinforced Natural Rubber Composites; Senapati, A.K.; Kutty, S.K.N.; Pradhan, B.; Nando, G.B. in Int. J. Polym. Mater. 12(3), pp. 203–224, 1989.

Compounding of Natural Rubber with Lignins; Kumaran, M.G. and De, S.K. in Kautschuk + Gummi Kunststoffe, vol. 30, No. 12, pp. 911–915.

Comparison of Rubber Reinforcement Using Various Surface–Modified Precipitated Silicas; Thammathadamikul, V.O.; O'Haver; Harwell, J.H.; Osuwan, S.; Na–Ranong, N. and Waddell, W.H., J. Appl. Polym. Sci., 59(11), 1741–1750 (1996).

A New Binary Acceleration System for Rubber Vulcanisation, Kuriakose, A.P.; Mathew, G., Indian J. Technol., 26(7), 344–347 (1988).

* cited by examiner

*Primary Examiner*—David W. Wu
*Assistant Examiner*—Rip A. Lee
(74) *Attorney, Agent, or Firm*—Connolly Bove Lodge & Hutz LLP

(57) ABSTRACT

Use, as modifier resin for rubber mixtures, of novolaks ABC plastified with terpene-type olefinically unsaturated natural substances C, where the ratio of the molar amount of the phenol or phenol derivative B and the molar amount of the natural substance C in the modified novolak is from 1:6 to 6:1, process for increasing the tear propagation resistance and reducing the compression set of rubber vulcanizates by adding these modifier resins to rubber mixtures, and components molded from vulcanizates thus prepared.

23 Claims, No Drawings

PLASTIFIED NOVOLAKS AS ADDITIVE TO RUBBER MIXTURES

FIELD OF THE INVENTION

The invention relates to a method of use of plastified novolaks as additive to rubber mixtures, leading to higher tear propagation resistance and also to lower compression set in the vulcanizates produced therefrom.

BACKGROUND OF THE INVENTION

For a higher service life or durability of rubber items made from natural or synthetic rubber it is desirable to maximize tear propagation resistance, and also to have low compression set, alongside the required mechanical properties such as Shore hardness, elongation at break, ultimate tensile strength, and moduli.

Examples of rubber vulcanizates are vehicle tires (e.g. for cars or trucks), and also industrial rubber goods, such as V-belts, tubes, toothed belts, membranes, conveyor belts, and substrate matrices for abrasives and frictional linings, etc.

Some attempts to achieve an ideally balanced combination of the abovementioned properties for a particular application of rubber vulcanizates are known from the prior art. Examples of systems described are: use of short fibers as reinforcing agent (Short Polyester Fiber Reinforced Natural Rubber Composites; Senapati, A. K.; Kutty, S. K. N.; Pradhan, B.; Nando, G. B. in Int. J. Polym. Mater. 12(3), pp. 203–224, 1989); rubber-modified polyethylene foam for sports shoe soles (WO-A 88/08860); preparation of mixtures made from natural rubber and lignins (Compounding of Natural Rubber with Lignins; Kumaran, M. G. and De, S. K. in Kautschuk+Gummi Kunststoffe, Volume 30, No. 12, pp. 911–915); Comparison of Rubber Reinforcement Using Various Surface-Modified Precipitated Silicas; Thammathadamikul, V. O.; O'Haver; Harwell, J. H.; Osuwan, S.; Na-Ranong, N. and Waddell, W. H., J. Appl. Polym. Sci., 59(11), 1741–1750 (1996); A New Binary Acceleration System for Rubber Vulcanisation, Kuriakose, A. P.; Mathew, G., Indian J. Technol., 26(7), 344–347 (1988).

When short fibers are used, very marked anisotropy effects arise. For example, the tear propagation resistance and the compression set parallel to the preferred orientation of the fibers is higher than in the direction perpendicular thereto. In addition, a very complicated mixing technique is needed to prepare these rubber vulcanizates comprising short fibers. The literature also discloses that the folding of, and passage of, the rubber mill bands through the narrow gap between the rolls always has to take place in the same direction, and using an ideal number, which has to be predetermined, of passages through the rolls. These complex mixing procedures require complicated monitoring when converting from laboratory to production scale. However, the rubber industry often uses internal mixers which are not particularly likely to give the fibers any desired orientation. As fiber concentration rises, furthermore, the incorporation time inevitably rises, the consequence being a drastic lowering of mixing capacity. In addition, the "scorch time" becomes markedly shorter, and this is in turn equivalent to an increase in risk associated with the processing of the mixtures.

Ultimate tensile strength and elongation at break of fiber-filled rubber vulcanizates are known to vary in opposite directions. For example, when comparison is made with the initial mixture (with no fiber content) comparable ultimate tensile strengths parallel to the orientation of the fibers are achieved only at fiber contents of 20 phr (parts per hundred resin; 20 g for 100 g of the rubber) and above, whereas acceptable elongations at break of from 100 to 300% are found here only for the transverse (perpendicular) direction. For example, the elongation at break falls from 650 to 30% in parallel orientation on addition of 10 phr of fibers. Although the tear propagation resistance can be increased by various levels of addition (from 10 to 40 phr) of the fibers from 23 N/mm to 116 N/mm for parallel orientation and from 25 N/mm to 97 N/mm for transverse orientation, this is achieved at the cost of a drastic reverse, as described above, in elongation at break, from 650 to 30%. In addition, a no less drastic rise in initial hardness occurs, from 41 to 92 Shore A.

The mechanical properties of short-fiber-reinforced natural rubber mixtures are thus dependent on the fiber orientation, the fiber concentration, and the ratio of length and diameter in the fibers used.

In WO-A 88/08860, Kozma et al. describes a rubber-modified polyethylene foam for sports shoe soles. The polyethylene used in the foam is EPDM-modified and crosslinked with peroxides. When comparison is made with an unmodified fine EPDM foam material, the result of the modification is, inter alia, an improvement in compression set.

Other studies (Kumaran and De) concern the incorporation of lignin, a by-product of papermaking, into rubber mixtures, in particular natural rubber mixtures. The rubber mixtures or the vulcanizate prepared therefrom exhibit a drastic drop in tear propagation resistance and an increase in compression set.

In the abovementioned article by O'Haver et al. (Comparison of Rubber Reinforcement Using Various Surface-Modified Precipitated Silicas), the authors study the effect of modified silicas on vulcanization curve, and also on the mechanical properties of a natural rubber mixture of the vulcanizates prepared therefrom. The modification described of the silicas by means of in-situ polymerization with styrene/isoprene or styrene/butadiene as comonomers is very complicated, however. For example, the in-situ polymerization comprises four reaction steps:

Adsorption of the surface-active substance (hexadecyltrimethylammonium bromide) onto the silica particles, adsorption of the monomers via a solution procedure, polymerization of the monomers, and removal of the surface-active substance by bleaching. This time-consuming and expensive procedure is balanced by improved tear propagation resistances and compression sets—with lowered elongation at break.

The authors Mathew and Kuriakose succeeded in improving ultimate tensile strength and tear resistance by using a two-component accelerator system [1-phenyl-2,4-dithiobiuret/TMTD (tetramethylthiuram disulfide)]. However, mechanical tests also showed that rebound resilience and compression set remain unchanged when comparison is made with the standard vulcanization conditions.

In EP-A 0 362 727, modified novolaks are disclosed comprising terpenes and unsaturated carboxylic acids, and/or derivatives of these compounds, the mass ratio between the terpenes and the unsaturated carboxylic acids being from 98.2:2.5 to 2.5:98.5, and the ratio of the mass of the phenolic component and the total mass of the modifiers being from 95:5 to 5:95, preferably from 10:90 to 90:10. Addition of these modified novolaks to other mixtures brings about a rise in hardness and moduli. Nothing is said concerning the effect on tear propagation resistance and compression set.

Surprisingly, it has now been found that the desired high tear propagation resistance can be obtained together with low compression set in vulcanizable rubber mixtures or vulcanizates prepared therefrom by incorporating certain plastified novolaks, and also the usual curing agents for curing the same, e.g. hexamethylenetetramine (HMT) or hexamethoxymethylmelamine (HMMM).

The present invention therefore provides a method of use, as modifier resin for rubber mixtures, of novolaks ABC plastified using terpene-type olefinically unsaturated natural substances C, such as rosin or rosin derivatives, comprising admixing the said components ABC to rubber mixtures the ratio between the amount of substance of the phenol or phenol derivative B and the amount of substance of the natural substance C in the modified novolak being from 1:6 to 6:1, and the melting point of the modified novolak being above 90° C.

The preparation of the plastified novolaks is based on the known methods, for example as described in DE-C 22 54 379.

For preparing the plastified novolaks ABC according to the invention, it is in principle possible to use any of the phenolic compounds which have at least one reactive hydrogen atom on the aromatic ring and are at least monofunctional in their reactivity with aldehydes. Examples of these include mononuclear or polynuclear phenolic compounds which may be monofunctional, bifunctional, trifunctional, or have even higher functionality in their reactivity with aldehydes such as formaldehyde. Examples of compounds which may be used individually, in succession one after the other, or as a mixture are therefore: phenol itself, the various isomers of cresol and of xylenol, the ethylphenol isomers, the propylphenol and isopropylphenol isomers, and also p- or o-substituted alkylphenols having up to 18, in particular up to 15, carbon atoms in the side chain. It is also possible to use unsaturated phenols, e.g. o- or p-vinylphenol, p-isopropenylphenol, or phenolic structures reacted with DCPD (dicyclopentadiene) and/or with styrene and/or with rosin. It is also possible to use polynuclear phenols, e.g. dihydroxybiphenyl, or isomers of diphenylolmethane (bisphenol F), of diphenylolethane, or of diphenylolpropane (bisphenol A). It is also possible to use polyfunctional mononuclear phenols, e.g. resorcinol, pyrocatechol, and hydroquinone.

Oxo compounds A which may be used are in principle any of the aldehydes and/or compounds containing keto groups or compounds providing these groups, where these are reactive toward phenols having active hydrogen atoms on the aromatic ring and can form condensation products with these. Among the oxo compounds which can be used as starting components, and may be used individually or in succession one after the other, or in a mixture, preference is given to the use of the aliphatic aldehydes, such as formaldehyde, acetaldehyde, and the homologs or isomers of these having up to 18 carbon atoms per molecule, in particular up to 12 carbon atoms per molecule. The use of aqueous formaldehyde solutions is particularly preferred. It is also possible to use ketones having up to 18, preferably up to 12, carbon atoms. Examples of preferred compounds are acetone, methyl ethyl ketone, diethyl ketone, and camphor.

The unsaturated terpene-type natural substances C are in particular resin acids and naturally occurring mixtures of these, for example abietic acid, neoabietic acid, levopimaric acid, pimaric acid, isopimaric acid, palustric acid, and also hydrogenated and dehydrogenated forms of these. The naturally occurring mixtures of these acids, the composition of which can vary greatly depending on origin, are termed rosin. This is produced as distillation residue during the production of turpentine oil (balsam resin), distillation residue during the production of tall oil (tall resin), or extract from conifer stumps (conifer root resin). The naturally occurring types of rosin also comprise admixtures of fatty esters, of terpene alcohols, and of hydrocarbons.

The novolaks may be prepared using acidic catalysts, either by the conventional process, i.e. under reflux at from 95 to 102° C., or else by what is known as the recycle process (U.S. Pat. No. 5,089,589). The acidic catalysts used preferably comprise strong mineral acids and/or their acidic derivatives, in particular sulfuric acid, hydrogen sulfates, or half esters of sulfuric acid, or organic acids, in particular oxalic acid dihydrate and p-toluenesulfonic acid.

The composition of the plastified novolaks used according to the invention as rubber component can be varied within a wide range. The ratio of the amounts of substance of its constituents phenol and aldehyde is from 1:0.4 to 1:1, in particular from 1:0.5 to 1:0.9. Particularly preferred constituents here are phenol itself and formaldehyde.

The ratio of the amounts of substance between phenol and the unsaturated terpene-type natural substances, in particular rosin, is from 1:6 to 6:1, in particular from 5:1 to 1:1.

Further characterization of the plastified novolak resins ABC is possible by stating their melting point and the viscosity of their solutions in a suitable organic solvent, these values being in the ranges conventional for novolaks:

Melting point (capillary, to DIN 53181): about 100° C. (from 60 to 120° C.)

Dynamic viscosity (DIN 53177/23° C.); 50% strength in methoxypropanol: from 350 to 1100 mPa.s Preference is given to the use of resins ABC which under standard conditions of temperature and humidity are in solid, small-particle form. The melting point here should be at least sufficiently high to prevent the products from clumping on storage at room temperature and during transport. Preference is given here to a melting point of above 90° C. for the novolak.

The plastified phenolic resins ABC may be used according to the invention in a very wide variety of vulcanizable rubber mixtures.

Preferred examples of suitable sulfur-vulcanizable rubber types which may be used are natural rubber (NR), polyisoprene (IR), polybutadiene (BR), styrene-butadiene rubber (SBR), acrylonitrile rubber (ACM and ANM), butyl rubber (IIR), chlorobutyl rubber, ethylene-propylene-diene terpolymer rubber (EPDM), and mixtures of these, as conventionally employed in the vehicle tire industry or for producing industrial rubber goods. Examples of the other conventional constituents are fillers, such as carbon blacks, silicas, chalk, kaolins, and also inorganic or organic pigments, such as titanium dioxide and iron oxide, and phthalocyanine dyes. Examples of other conventional constituents are vulcanizing agents selected from the group consisting of sulfur and sulfur-donating compounds, and also vulcanization agents, e.g. accelerators and activators. It is also conventional to use additives, e.g. those selected from the group consisting of stearic acid, zinc oxide, antioxidants, tackifying resins, and metal compounds for additional improvement of adhesion of the rubber to steel cord, for example the cobalt or nickel salts of monobasic carboxylic acids, preferably naphthenic acids or isooctanoic acids. Mineral oils and plasticizers, e.g. phthalic esters, are also conventional additives for improving processability.

The mixtures of rubber and modifier resin ABC preferably also comprise curing agents D. The curing of the modified novolak resins ABC used according to the invention takes place here via elimination of formaldehyde from the curing agents D at an elevated temperature during the vulcanization of the mixtures of rubber and modifier resin. Examples of suitable curing agents are hexamethylenetetramine and what are known as methylene donors in the form of triazine resins, in particular melamine-formaldehyde resins of suitable composition. These melamine resins may be used undiluted as crystalline or liquid products or, preferably, as advantageously processable free-flowing products after prior adsorption on suitable solid substrate materials, such as finely divided silicas.

According to the invention, the modified phenolic resins ABC are used in vulcanizable rubber mixtures which can be prepared in the conventional way, e.g. in (heatable) internal mixers or on (heatable) mixing rolls. It can be advantageous here to increase the mixing temperature to a value above the melting range of the resin added during a freely selectable mixing phase in order to improve distribution of the resins. It is also important that the hardeners are incorporated as near as possible to the end of the mixing procedure at temperatures which are not excessive (from 80 to 100° C.), to avoid premature reaction with the crosslinkable resin components.

A preferred mixing procedure has two mixing stages. In the first mixing stage, the rubber or the various types of rubber and the modifier resin ABC are mixed at temperatures of up to about 160° C. (preferably in an internal mixer) with the additives conventional in rubber technology, for example carbon black, antioxidants, ZnO, expelled oil, and silica. This mixture is then mixed, in a second mixing step at temperatures of from 80 to 100° C., with the vulcanization agents, e.g. vulcanization accelerators and sulfur, and also with the curing agents D.

In other respects, known criteria may be used for selection of the components and establishing their mass fractions in the vulcanizable rubber mixtures. Mixing of the components at relatively high temperatures may likewise take place in a known manner, e.g. at from 100 to 160° C. Vulcanization of the rubber mixtures may also take place in a known manner at conventional temperatures in conventionally heatable apparatus, where appropriate under pressure.

The mass fraction of the plastified novolaks ABC in the vulcanizable rubber mixtures may preferably be up to 20%, in particular up to 15%, particularly preferably from 0.5 to 10%, based on the mass of the vulcanizable rubber mixture (=100%). It is generally also possible to make concomitant use of other known phenolic resins (reinforcing resins or vulcanization resins), e.g. Alnovol® PN 320 or, respectively, 160, as long as they do not cause or have any disadvantageous or detrimental effects.

The vulcanizable rubber mixtures modified according to the invention, which can be prepared, processed, and vulcanized by known methods, are very well suited for the production of industrial rubber goods, preferably those exposed to high mechanical loads. They may in particular be used for producing tubes, drive belts, such as V-belts, transmission belts, and toothed belts, gaskets with reinforcement, conveyor belts, and vehicle tires, e.g. for cars, trucks, earth-moving machinery, tractors, and aircraft, since they have excellent elongation at break and tear propagation resistance together with low compression set. They are also suitable for producing rubber coatings on solid bodies for protection from mechanical damage or corrosion.

The examples below provide further clarification of the invention.

EXAMPLES

Unless otherwise stated, as in the text hereinbefore, all data with the unit "%" which relate to mixed phases in the examples below denote mass fractions (ratio of the mass of the relevant substance and the mass of the mixture). Concentration data in "%" are mass fractions of the dissolved substance in the solution (mass of dissolved substance divided by mass of solution).

Example 1

Preparation of a Plastified Novolak

For the condensation reaction and the further processing of the reaction mixture, use was made of a 2 liter four-necked glass flask equipped with thermostatic heating, stirrer, thermometer, and feed apparatus, and also with reflux condenser with water separator. The water separator had an adjustable-height syphon which permitted continuous water removal.

640 g of phenol, 511 g of rosin, 146 g of xylene, and 6 g of paratoluenesulfonic acid were placed in the reactor, and the mixture was heated to 130° C. Once this temperature had been reached, 500 g of a 37% strength aqueous formaldehyde solution was added dropwise from a metering vessel within 4.5 hours. During the feed, the temperature of the mixture increased to 150° C. After 5 hours of heating to reflux, 440 g of an aqueous phase had separated in the water separator and comprised less than 1% of formaldehyde.

6 g of triethanolamine were then added to the mixture, and the solvent was removed by distillation on the downward-inclined condenser, initially at atmospheric pressure, until a bottom temperature of 200° C. had been reached. During this procedure, the flask was flushed with nitrogen as inert gas. Once 200° C. had been reached, steam distillation was carried out at reduced pressure for 30 min to remove the unreacted phenol. Distillation was then continued for a further 30 min at 200° C. under reduced pressure (30 hPa=30 mbar). The distillation residue was then cooled, and 1100 g of a pale yellow resin were obtained, this having a melting point of 110° C. and a viscosity of 630 mPa.s in the form of a 50% solution in methoxypropanol at 23° C. The free phenol content of the resin was less than 1%.

Example 2

640 g of phenol, 1020 g of rosin, 146 g of xylene, and 8 g of para-toluenesulfonic acid were placed in a reactor, as in Example 1, and the mixture was heated to 130° C. Once this temperature had been reached, 500 g of a 37% strength aqueous formaldehyde solution were added dropwise from a metering vessel within 4.5 hours. During the feed, the temperature of the mixture increased to 150° C. After 5 hours of heating at reflux, 440 g of an aqueous phase had separated in the water separator and comprised less than 1% of formaldehyde.

8 g of triethanolamine were then added to the mixture, and the solvent was removed by distillation on the downward-inclined condenser, initially at atmospheric pressure, until a bottom temperature of 200° C. had been reached. During this procedure, the flask was flushed with nitrogen as inert gas. Once 200° C. had been reached, steam distillation was carried out at reduced pressure for 30 min to remove the unreacted phenol. Distillation was then continued for a further 30 min at 200° C. under reduced pressure (30 hPa=30 mbar). The distillation residue was then cooled, and 1600 g of a pale yellow resin were obtained, this having a melting point of 98° C. and a viscosity of 460 mPa.s in the form of a 50% solution in methoxypropanol at 23° C. The free phenol content of the resin was less than 1%.

Test Mixing Specifications:

Table 1 shows the compositions (weights in g) of the rubber mixtures to be studied after full vulcanization. The additives (weights in g) given in Table 1 were each added to 100 g of rubber. These mixtures were then mixed with the phenolic resins in accordance with the data in Table 2.

TABLE 1

Base mixture (weight of components in g)

| Test mixture | Curing with HMT (Rubber mixtures 2-) | Curing with HMMM (rubber mixtures 3-) |
|---|---|---|
| Natural rubber | 100 | 100 |
| Carbon black (N 326) | 70 | 70 |
| Stearic acid | 1.5 | 1.5 |
| Zinc oxide | 5 | 5 |
| Antioxidant | 2 | 2 |
| Sulfur | 2.5 | 2.5 |
| ®Vulkacit CZ (CBS) | 1.2 | 1.2 |
| Curing agent: HMT | 1.0 | |
| Curing agent: HMMM (®Resimene XT 911) | | 3.0 |

HMT: hexamethylenetetramine
HMMM: hexamethoxymethylmelamine

TABLE 2

Rubber mixtures 2-0 to 2-4, cured with HMT (hexamethylenetetramine)

| Variable constituent in g | | 2-0 | 2-1 | 2-2 | 2-3 | 2-4 |
|---|---|---|---|---|---|---|
| ®Alnovol PN 160 | | | 9 | | | |
| ®Alnovol PN 320 | | | | 9 | | |
| Resin from Example 1 | | | | | 9 | |
| Resin from Example 2 | | | | | | 9 |
| HMT | | | 1 | 1 | 1 | 1 |
| Vulcanization (145° C.) | min | 20 | 45 | 45 | 45 | 45 |
| Mechanical properties: | | | | | | |
| Mooney L 1 + 4/120° C. | | 39 | 40 | 49 | 41 | 37 |
| Ultimate tensile strength | MPa | 25 | 16 | 12 | 17 | 16 |
| Elongation at break | % | 289 | 207 | 165 | 270 | 223 |
| Modulus at 10% elongation | MPa | 1.0 | 2.8 | 2.7 | 1.9 | 1.5 |
| Modulus at 50% elongation | MPa | 2.7 | 4.4 | 4.3 | 3.1 | 2.9 |
| Modulus at 100% elongation | MPa | 6.0 | 7.3 | 7.0 | 5.4 | 5.9 |
| Hardness Shore A (23° C.) | | 74 | 92 | 90 | 87 | 84 |
| Hardness Shore A (70° C.) | | 72 | 89 | 88 | 85 | 82 |
| Tear propagation resistance | N/mm | 36 | 41 | 27 | 64 | 57 |
| Compression set (100° C./24 h) | % | 47 | 64 | 61 | 54 | 49 |

As can be seen from Table 2, when comparison is made with the standard mixtures 2–1 and 2—2, the tear propagation resistances and the elongations at break increase dramatically when the plastified novolaks (resins from Examples 1 and 2, mixtures 2–3 and 2–4) are used, and the compression sets (100° C./24 h) decrease, while the ultimate tensile strength remains practically unaffected. This is the effect of the use according to the invention. The moduli and hardness values consequently decrease. When comparison is made with the zero mixture (2–0), the ultimate tensile strength decreases, the Shore hardness and the compression set increase, and the tear propagation resistance is considerably improved.

The resins ®Alnovol PN 160 and PN 320 (Solutia Germany GmbH & Co. KG) are unplastified standard novolaks based on phenol/alkylphenol/formaldehyde.

®Resimene XT 911 (Solutia Germany GmbH & Co. KG) is a hexamethoxymethylmelamine in liquid form.

TABLE 3

Rubber mixtures 3-0 to 3-4, cured with HMMM (hexamethoxymethylmelamine)

| Variable constituent in g | | 3-0 | 3-1 | 3-2 | 3-3 | 3-4 |
|---|---|---|---|---|---|---|
| ®Alnovol PN 160 | | | 7 | | | |
| ®Alnovol PN 320 | | | | 7 | | |
| Resin from Example 1 | | | | | 7 | |
| Resin from Example 2 | | | | | | 7 |
| HMMM | | | 3 | 3 | 3 | 3 |
| Vulcanization (145° C.) | min | 20 | 60 | 60 | 45 | 45 |
| Mechanical properties: | | | | | | |
| Mooney L 1 + 4/120° C. | | 39 | 31 | 33 | 28 | 28 |
| Ultimate tensile strength | MPa | 25 | 16 | 15 | 20 | 20 |
| Elongation at break | % | 289 | 244 | 235 | 333 | 308 |
| Modulus at 10% elongation | MPa | 1.0 | 3.5 | 3.4 | 2.0 | 1.7 |
| Modulus at 50% elongation | MPa | 2.7 | 4.6 | 4.6 | 3.2 | 3.1 |
| Modulus at 100% elongation | MPa | 6.0 | 6.7 | 6.7 | 5.2 | 5.8 |
| Hardness Shore A (23° C.) | | 74 | 94 | 92 | 87 | 84 |
| Hardness Shore A (70° C.) | | 72 | 92 | 90 | 85 | 82 |
| Tear propagation resistance | N/mm | 36 | 31 | 32 | 68 | 70 |
| Compression set (100° C./24 h) | % | 47 | 76 | 71 | 60 | 60 |

In Table 3 it can be seen that the effect apparent with mixtures 2–0 to 2–4 (Table 2) is amplified by using the curing agent HMMM. Curing with HMMM therefore also results in a marked improvement in elongation at break and in tear propagation resistance together with a reduction in compression set when comparison is made with reinforcement by phenolic resins as in the prior art (mixtures 3–1, 3–2) or with the zero mixture (3–0).

What is claimed is:

1. A process to increase the propagation resistance and to reduce the compression set of vulcanizates prepared from rubber mixtures comprising admixing modified novolaks ABC plastified with resin acids C and naturally occuring mixtures of these, where the ratio between the molar amount of the phenol or phenol derivative B and the molar amount of the resin acids C in the modified novolak is from 1:6 to 6:1.

2. The process as claimed in claim 1, wherein the novolaks contain units of phenols B selected from the group consisting of phenol, the cresol isomers and xylenol isomers, the ethylphenol isomers, the propyl- and isopropylphenol isomers, o- and p-vinylphenol, p-isopropenylphenol, dihydroxybiphenyl, the diphenylolmethane (bisphenol F) isomers, the diphenylolethane and diphenylolpropane (bisphenol A) isomers, resorcinol, pyrocatechol, and hydroquinone.

3. The process as claimed in claim 1, wherein the novolaks contain units derived from oxo compounds A selected from the group consisting of formaldehyde and other aliphatic aldehydes and ketones having up to 18 carbon atoms.

4. The process as claimed in claim 1, wherein the resin acids C comprise at least one resin acid selected from the group consisting of abietic acid, neoabietic acid, levopimaric acid, pimaric acid, isopimaric acid, palustric acid, and the hydrogenated and dehydrogenated forms of these.

5. The process as claimed in claim 1, wherein the modified novolak ABC is admixed to a rubber selected from the group consisting of natural rubber, polyisoprene, polybutadiene, styrene-butadiene rubber, acrylonitrile rubber, butyl rubber, chlorobutyl rubber, ethylene-propylene-terpolymer rubber, and mixtures of these.

6. The process as claimed in claim 5, wherein the ratio by weight of modified novolak ABC to rubber is from 0.5 g/100 g to 20 g/100 g.

7. The process as claimed in claim 5, comprising adding to the mixture made from rubber and modified novolak ABC, other additives and/or auxiliaries selected from the group consisting of carbon black, sulfur, silica, chalk, stearic acid, zinc oxide, vulcanization accelerators, and vulcanization activators.

8. The process as claimed in claim 1, comprising adding to the mixture a curing agent D.

9. The process as claimed in claim 1, wherein the modified novolak ABC is prepared by reacting hydroxyaromatic compounds B with aliphatic oxo compounds A in the presence of the resin acids C.

10. The process as claimed in claim 1, wherein the modified novolak ABC is prepared by reacting a solution or the melt of a previously formed novolak AB with a resin acid C.

11. The process as claimed in claim 1, wherein a curing agent D is added to the rubber mixture.

12. The process as claimed in claim 1, wherein a curing agent D is added to the modifier resin ABC.

13. The process as claimed in claim 1, wherein a curing agent D is added to both the rubber mixture and the modifier resin ABC.

14. The process as claimed in claim 13, wherein the manner of dividing the curing agent between the rubber mixture and the modified novolak is such that the amount added to the rubber mixture amounts to from 40 to 80% of the total amount of the curing agent.

15. A molded vulcanized rubber component or a tire, produced by the process of any of claims 1 to 14.

16. A tire for a car, a truck, earth-moving machinery, a tractor, and/or an aircraft, produced by the process of any of claims 1 to 14.

17. A V-belt, a transmission belt, or a toothed belt, produced by the process of any of claims 1 to 14.

18. A tube produced by the process of any of claims 1 to 14.

19. A rubber roll produced by the process of any of claims 1 to 14.

20. A conveyor belt produced by the process of any of claims 1 to 14.

21. A rubber coating on a solid body, produced by the process of any of claims 1 to 14.

22. A substrate matrix for an abrasive and/or frictional lining, produced by the process of any of claims 1 to 14.

23. A gasket produced by the process of any of claims 1 to 14.

* * * * *